United States Patent [19]

Strunk et al.

[11] Patent Number: 5,078,949
[45] Date of Patent: Jan. 7, 1992

[54] METHOD OF PRODUCING A HOLLOW SHAPED BODY

[75] Inventors: Harald Strunk, Plettenberg; Kurt Göhr, Attendorn-Windhausen, both of Fed. Rep. of Germany

[73] Assignee: Schade KG, Plettenberg, Fed. Rep. of Germany

[21] Appl. No.: 530,090

[22] Filed: May 29, 1990

[30] Foreign Application Priority Data

May 29, 1989 [DE] Fed. Rep. of Germany ....... 3917366

[51] Int. Cl.$^5$ .................. B29C 45/00; B29D 22/00
[52] U.S. Cl. .................. 264/572; 264/328.8; 264/328.12; 264/328.13
[58] Field of Search ........... 264/37, 85, 328.8, 328.12, 264/328.13, 572

[56] References Cited

U.S. PATENT DOCUMENTS 4,101,617 7/1978 Friederich ........................... 264/572
4,824,732 4/1989 Hendry et al. ...................... 264/37 X

FOREIGN PATENT DOCUMENTS 2461580 7/1975 Fed. Rep. of Germany .
2501314 7/1976 Fed. Rep. of Germany .
2256021 7/1975 France .
2139548B 11/1986 United Kingdom .

OTHER PUBLICATIONS

P. Friel "Werkzeugtemperierung", Kunststoffe 75 (1985) 12, pp. 882-888.

Primary Examiner—Leo B. Tentoni
Attorney, Agent, or Firm—Michael J. Striker

[57] ABSTRACT

A hollow injected shaped body of synthetic plastic is produced by injecting a predetermined quantity of a synthetic plastic melt into a multi-part mold, and forming the melt to the shaped body by a gas under pressure. After bringing the synthetic plastic melt into the mold cavity, the gas is injected into the synthetic plastic melt, then after overcoming the shaped body wall it flows into an overflow chamber from it into a gas circulation system so that during the forming of the melt a hollow formed in the shaped body is continuously supplied with the gas until rigidification of the shaped body.

9 Claims, 1 Drawing Sheet

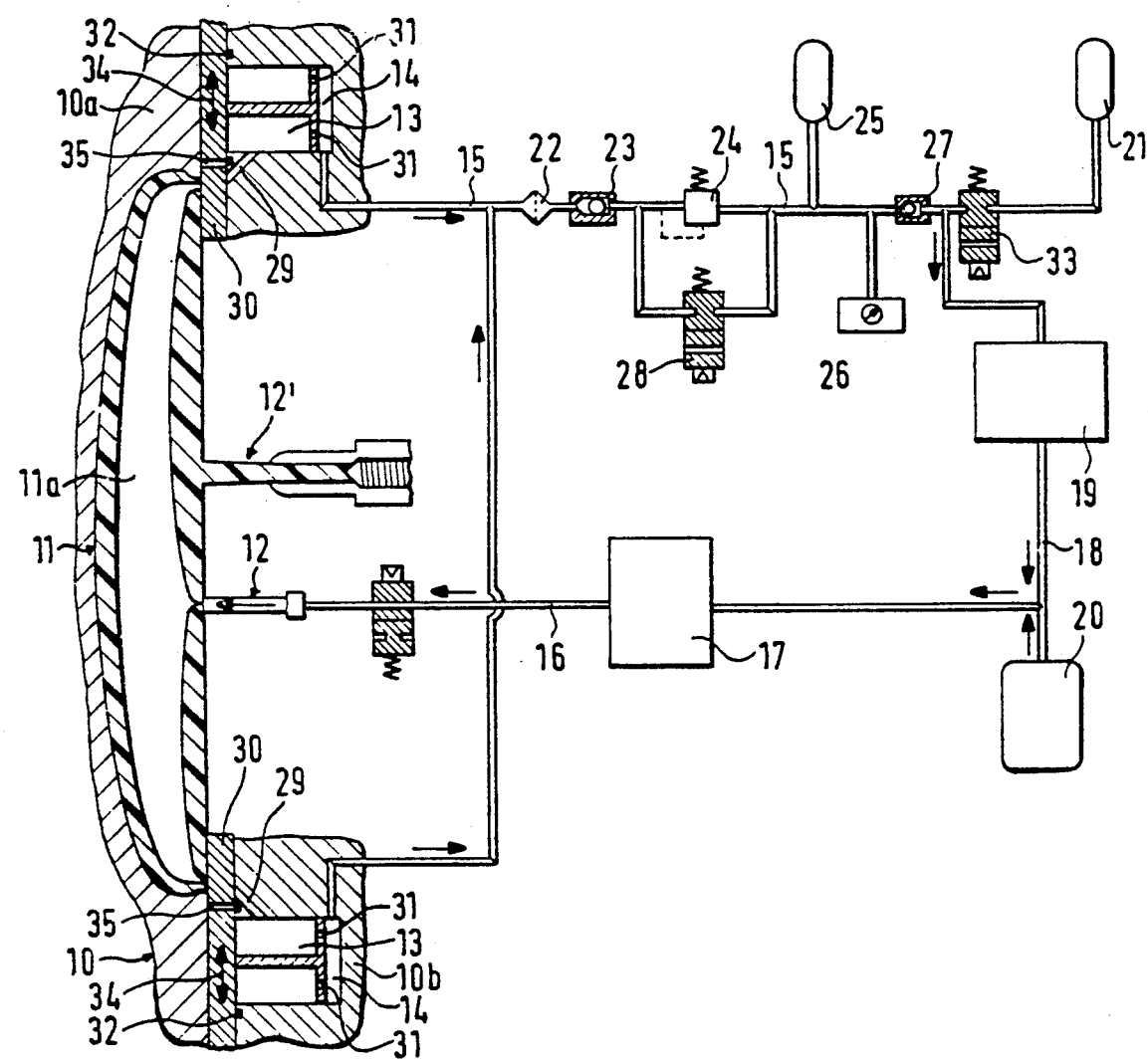

METHOD OF PRODUCING A HOLLOW SHAPED BODY

BACKGROUND OF THE INVENTION

The present invention relates to a method of and an arrangement for producing of hollow injected shaped bodies of synthetic plastic material.

Hollow injection processes for producing synthetic plastic shaped bodies to be used in the automobile industry for example central consoles, coating parts, arm rests, etc. are known in various forms. In accordance with one known process disclosed for example in the German document DE-OS 2,501,314, the gas, after filling the mold with a synthetic plastic melt, is introduced by an injection nozzle directly into the synthetic plastic mold. After a sufficient cooling time, the injection nozzle is separated from the mold and thereby the hollow of the shaped body is open to atmosphere. After discharging the gas from the hollow of the shaped body and a pressure equalization with the atmosphere, the mold is open and the finished shaped body is removed from the mold.

In the known processes, the forming of the shaped body is performed by a stationary pressure cushion formed by the gas during the whole process time. Since the gas cannot contribute to a cooling of the shaped hollow body due to a static pressure cushion, the cooling time per injection cycle in this process is relatively long and therefore the output of such a device is relatively low. This device has an especially grave disadvantage when, due to the construction of the shaped body parts, the inner cross-section is formed as a blind hole which during filling is forcedly supplied with the synthetic plastic melt and therefore the stationary gas pressure cushion cannot contribute to the desired hollow formation of the shaped body in the region of the blind hole cross-section. The thusly produced uncontrollable material accumulation in this cross-sectional region poses the danger of forming sink marks due to a non-uniform wall thickness of the shaped body. A further disadvantage is connected with the non-uniform cooling of the outer wall of the shaped body by the adjoining molding tool relative to the wall of the hollow of the shaped body, due to the stationary gas pressure cushion. This leads to distortions and material shrinkage zones in the shaped body and as a result to a lower quality of the finished product, which then requires subsequent expensive surface treatments.

SUMMARY OF THE INVENTION

Accordingly, it is an object of the present invention to provide a method of the above mentioned general type which avoids the disadvantages of the prior art.

More particularly, it is an object of the present invention to provide a method of producing hollow injected bodies of synthetic plastic material which provides for a reduction of the cooling time per injection cycle as well as an increase in the quality of the finished product, especially a uniform wall cross-section and an improved surface quality.

It is also an object of the present invention to provide an efficient arrangement for producing hollow injected shaped bodies of synthetic plastic material, in which the above mentioned advantages can be achieved.

In keeping with these objects and with others which will become apparent hereinafter, one feature of the present invention resides, briefly stated, in a method in accordance with which the gas, after bringing the synthetic plastic melt into the hollow space of the mold, is injected into the synthetic plastic melt, then with overcoming of the shaped body wall it flows into an overflow chamber, and from there flows into a gas circulating system so that during the formation of the melt the gas continuously flows through a hollow formed in the shaped body until rigidification of the shaped body.

In the method in accordance with the present invention, shortly after the end of the injection process of the synthetic plastic melt into the mold hollow, the whole quantity of gas is first injected into the inner space of the mold or in other words directly into the synthetic plastic melt. The pressure is so high that the synthetic plastic melt abuts against the inner wall of the hollow space with formation of a hollow in the shaped body. Due to the positive pressure in the hollow of the shaped body, the gas flowing after this forces the excessive melt material at predetermined locations out of the mold into an overflow chamber. Later, during entering the overflow chamber, the gas column breaks through the melt material and can expand in the overflow chamber. This effect is used to supply the gas under high pressure into the gas circulating system. In other words, the gas which flows from overflow chamber is again supplied into the gas circulating system and then flows forcedly into the hollow of the shaped body located in the mold. Then it flows through openings in the melt into the overflow chamber and again into the circulation. Thereby a definite controllable, continuously circulating pressure gas flow in the hollow of the shaped body is produced. As a result, a fine inner cooling of the hollow of the shaped body is achieved, and therefore injection cycle times are significantly reduced and a surface quality of the shaped body is improved so that a post-treatment of visible surfaces of the shaped body is no longer necessary.

In accordance with the present invention, the gas flow is produced in an especially simple manner by a pressure differential between an inflow side and an outflow side of the gas flowing in the mold and from the mold. The pressure ratio is selected so as to maintain a sufficient inner pressure required for the formation of the shaped body during the gas flow. Preferably the differential pressure amounts to 2:1. Advantageously, the synthetic plastic melt injected into the hollow space of the mold amounts to 50–100% of the total volume of the hollow space of the mold, before the injection of the gas. Therefore, a sufficient space remains in the hollow space of the mold for expansion of the gas with formation of a desired positive pressure in the hollow of the shaped body.

In accordance with another advantageous feature of the present invention, the gas flow after entering the melt breaks in the overflow chamber through the melt wall due to the positive pressure produced in the hollow space of the melt. In accordance with an advantageous embodiment of the inventive method, the gas before entering the overflow chamber, passes through an intermediate passage of a cross-section significantly smaller than that of the overflow chamber. Therefore, the gas after breaking through the wall of the shaped body melt in the region of the overflow chamber behind the intermediate passages, entrains only a small part of the wall material of the shaped body melt by the gas stream and brings it into the overflow chamber. The entrained wall material is removed in the overflow chamber automatically during opening of the molding tool. Advantageously, the overflow chamber is tightly sealed from atmosphere during the gas circulation.

The inventive arrangement for producing hollow injected shaped bodies includes a mold which has a hollow space and, in addition, an overflow chamber which is sealed from atmosphere and used for receiving the gas flowing out of the hollow space. The arrangement has a compressor for the gas, a pressure container for the compressed gas, and a pressure reducer for the gas flowing from the overflow chamber. In accordance with an advantageous embodiment of the inventive arrangement, the overflow chamber is connected with a return conduit for passing the gas which flows from the overflow chamber.

The return conduit is provided at least with a pressure reducer and a closed storage container for the expanded gas. Advantageously, the return conduit has also a filter, two check valves, a pressure indicating device which controls a pressure supply unit, and in some cases a recovery device associated with the pressure reducer.

In accordance with another embodiment of the present invention, the pressure container is connected with a supply conduit which leads to the mold. The supply conduit is connected with a return conduit through an intermediate conduit. A gas compressor is provided in the intermediate conduit, and a gas supply unit is arranged in the intermediate conduit before the gas compressor as considered in the flow direction of the gas. Advantageously, a proportioning valve is arranged in the supply conduit. Preferably, the intermediate passage is closeable at the discharge side for the gas by a slider or a similar device. The slider opens after the end of the melt supply into the mold. Advantageously, the slider is controllable in dependence upon the gas pressure in the mold.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing an arrangement for producing hollow injected bodies in accordance with the present invention by an inventive method.

DESCRIPTION OF A PREFERRED EMBODIMENT

An arrangement for producing hollow injected shaped bodies of synthetic plastic material has a two-part mold 10 which includes an upper mold part 10a and a lower mold part 10b. The inner chamber is designed in correspondence with the outer contour of the shaped body to be produced. The final shape of a finished shaped body 11 with a shaped body hollow 11a is shown in the sketch for the sake of simplicity.

An injection nozzle 12 for gas and a nozzle 12' for a melt supply are associated with the lower mold part 10b. Overflow chambers 13 of a desired number are arranged at the outer edge of the shaped body 11. In the shown embodiment the overflow chambers are circular, however they can have also other cross-sections. A gas withdrawal passage 14 is integrated in the overflow chambers. The gas withdrawal passage is connected with the overflow chamber 13 through openings 31. A gas return conduit 15 is connected with the withdrawal passage 14. Depending on the construction of the inventive arrangement, the gas withdrawal passage 14 can be dispensed with, and the pressure gas can be supplied directly in the conduit 15.

The gas injection nozzle 12 is supplied from a supply conduit 16. The compressed gas flows through the supply conduit 16 into the mold 10. A proportioning valve 17 is arranged in the supply conduit 16. The return conduit 15 is connected with the supply conduit 16 through an intermediate conduit 18. A gas compressor 19 is arranged in the intermediate conduit 18. Further, a pressure container 20 for storing the compressed gas is connected with the supply conduit 16 through another conduit. The pressure container is located before the proportioning valve 17 as considered in the flow direction of the gas. A gas supply unit 21 is connected with the intermediate conduit 18 in the connecting region of the return conduit 15. The connection is performed through another conduit and an interposed valve 33.

Several structural elements are arranged one after the other in the return conduit 18 as considered in the flow direction of the gas. These elements include a filter 22, a check valve 23, a pressure reducer 24, a storage container 25 for the expanding gas, a pressure indicating device 26 for controlling the gas supply unit 21, and a further check valve 27. A recovery device 28 is connected in parallel is and located in the region of the pressure reducer 24. The recovery device can be integrated and connected to the system in such a manner that during opening of the molding tool the residual gas quantity which remains in the conduit system is again supplied to the gas supply and during the next injection cycle can be used again. In this case there is a further advantage in that, during opening of the molding tool the conventional gas expansion noise is completely dispensed with.

The method in accordance with the present invention is performed in the following manner:

First, synthetic plastic melt is injected into a closed mold 10 through the injection nozzle 12' and in such a quantity that approximately 50 to 100% of the hollow in the mold tool is filled. Then gas, for example nitrogen, with a pressure of approximately 200 bar is injected into the melt from the pressure container 20 through the supply conduit 16. The melt is pressed due to the positive pressure against the inner wall of the mold. Intermediate passages 29 are arranged at each suitable location at the outer side of the shaped body and closed by a slider 30. The slider 30 reciprocates in the direction of arrow 34 until the end of the melt supply into the mold through the nozzle 12'. After opening of the slider, or in other words, after alignment of the mouths of the intermediate passages 29 in the lower mold part 10b with the mouths of throughflow passages 35 in the slider 30, the wall of the non-self-supporting shaped body is broken by the gas pressure, and then the gas flows through the passages 29, 35 with entrained residual quantities of the synthetic plastic melt to the overflow chamber 13. The pressure reducer 24 is adjusted so that the gas is expanded at a pressure for example 100 bar as soon as it is discharged from the mold into the overflow chamber 13. With the closed mold 10, the overflow chamber 13 is sealed relative to the mold 10 at the point 32. Therefore the gas flows through the return conduit 15 with interposition of the pressure reducer 24, the storage container 25, the gas compressor 19 and the positioning valve 17, back to the mold 10. After elapsing of a predetermined time which is sufficient for cooling of the shaped body 11, the upper mold part 10a is lifted from the lower mold part 10b. Thereby the residual pressure of the mold part is released to the atmosphere and the finished shaped body 11 is removed from the mold. The gas flow directions are identified in the drawings by the arrows which are not provided with reference numerals.

It will be understood that each of the elements described above, or two or more together, may also find a useful application in other types of constructions differing from the types described above.

While the invention has been illustrated and described as embodied in an arrangement for and a method of producing hollow injected shaped bodies of synthetic plastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of producing a hollow injected shaped body of synthetic plastic material, comprising the steps of injecting a predetermined quantity of a synthetic plastic melt into a hollow space of a multi-part closed mold; forming the melt to a shaped body with a hollow by a gas under pressure, said forming including injecting the gas into the mold after bringing the synthetic plastic melt into the hollow space of the mold, overcoming a wall of the shaped body by the gas, then flowing the gas into an overflow chamber, then flowing the gas from the overflow chamber into a gas circulating system, and then again flowing the gas from the gas circulating system into the mold so that during the forming of the melt to a shaped body the gas continuously flows through said hollow of the same shaped body until rigidification of the shaped body.

2. A method as defined in claim 1; and further comprising the step of providing a pressure differential between an inflow side and an outflow side of the gas so that gas flows into the mold and out of the mold under the action of the pressure differential.

3. A method as defined in claim 2, wherein said pressure differential of the gas between the inflow side and the outflow side has such a magnitude that during a flow of gas a sufficient inner pressure is maintained in the mold for the forming of the shaped body.

4. A method as defined in claim 2, wherein the pressure differential between the inflow side and the outflow side has a ratio of substantially 2:1.

5. A method as defined in claim 1, wherein before the injecting of the gas into the mold the synthetic plastic melt occupies between 50 and 100% of a volume of the hollow space of the mold.

6. A method as defined in claim 1, wherein said overcoming including breaking a wall of the shaped body by the gas after the gas enters the melt and then flowing the gas in the overflow chamber, due to a positive pressure acting in the hollow of the shaped body.

7. A method as defined in claim 6; and further comprising the step of flowing the gas into an intermediate passage of a cross-section which is substantially smaller than that of the overflow chamber, prior to the gas flow into the overflow chamber.

8. A method as defined in claim 1; and further comprising the step of tightly closing the overflow chamber from atmosphere during a gas circulation.

9. A method of producing a hollow injection shaped body of synthetic plastic material, comprising the steps of injecting a predetermined quantity of a synthetic plastic melt into a hollow space of a mold; and forming the melt to a shaped body with a hollow by a gas under pressure, said forming including injecting the gas into the mold after bringing the synthetic plastic melt in to the hollow space of the mold, overcoming a wall of the shaped body by the gas, then flowing the gas after overcoming the wall of the shaped body into a gas circulating system and then again flowing the gas from the gas circulating system back into the mold, so that during the forming of the melt to a shaped body the gas continuously flows through said hollow of the same shaped body until rigidification of the shaped body.

* * * * *